United States Patent
Harihar et al.

(10) Patent No.: US 12,182,572 B2
(45) Date of Patent: Dec. 31, 2024

(54) CALL AND RETURN INSTRUCTIONS FOR SAVING AND RESTORING DIFFERENT SETS OF CONTEXT REGISTERS MAPPED TO DIFFERENT CALL OPCODES

(71) Applicant: Infineon Technologies AG, Neubiberg (DE)

(72) Inventors: Manoj Kumar Harihar, Germering (DE); Arndt Voigtlaender, Ottobruun (DE)

(73) Assignee: Infineon Technologies AG, Neubiberg (DE)

( * ) Notice: Subject to any disclaimer, the term of this patent is extended or adjusted under 35 U.S.C. 154(b) by 187 days.

(21) Appl. No.: 17/401,718

(22) Filed: Aug. 13, 2021

(65) Prior Publication Data

US 2023/0051855 A1 Feb. 16, 2023

(51) Int. Cl.
*G06F 9/30* (2018.01)
*G06F 9/448* (2018.01)
*G06F 9/46* (2006.01)

(52) U.S. Cl.
CPC ...... *G06F 9/30054* (2013.01); *G06F 9/30043* (2013.01); *G06F 9/30101* (2013.01); *G06F 9/4484* (2018.02); *G06F 9/461* (2013.01)

(58) Field of Classification Search
CPC ............... G06F 9/3004; G06F 9/30043; G06F 9/30054; G06F 9/30101; G06F 9/4484; G06F 9/461
See application file for complete search history.

(56) References Cited

U.S. PATENT DOCUMENTS

| | | | | |
|---|---|---|---|---|
| 5,210,874 A * | 5/1993 | Karger | ..................... | G06F 9/468 712/E9.082 |
| 5,214,786 A * | 5/1993 | Watanabe | ........... | G06F 9/30138 712/228 |
| 5,321,823 A * | 6/1994 | Grundmann | ............ | G06F 9/462 712/226 |
| 5,682,531 A * | 10/1997 | Nakamura | ............ | G06F 9/3861 712/228 |
| 5,796,970 A * | 8/1998 | Higaki | ................ | G06F 9/30043 712/228 |
| 2003/0177342 A1* | 9/2003 | Morita | ................ | G06F 9/30105 712/228 |

OTHER PUBLICATIONS

Leonard et al., "VAX Architecture Reference Manual", Digital Equipment Corporation, 1987, 433 pages.*

* cited by examiner

*Primary Examiner* — David J. Huisman
(74) *Attorney, Agent, or Firm* — Eschweiler & Potashnik, LLC (57) ABSTRACT

Systems, devices, circuitries, and methods are disclosed for identifying, within a call instruction, context registers for storing prior to a jump to another subroutine. In one example, a method includes receiving, while executing a first subroutine, a call instruction that includes a first opcode and identifies a first target address, wherein the first target address stores instructions for performing a second subroutine. A first set of context registers identified by the call instruction is determined and the content of the first set of context registers is stored in first memory allocated for context storage for the first subroutine prior to executing the instruction stored in the first target address.

6 Claims, 6 Drawing Sheets

CALL AND RETURN INSTRUCTIONS FOR SAVING AND RESTORING DIFFERENT SETS OF CONTEXT REGISTERS MAPPED TO DIFFERENT CALL OPCODES

FIELD

The present disclosure relates to the field of processors and central processing units (CPUs).

BACKGROUND

As a processor executes an instruction of a first or calling subroutine that requires a jump to a second subroutine, the content of certain registers used by the calling subroutine may be stored. This enables the calling subroutine to retrieve program data and relevant addresses in their state prior to the call and proceed coherently after the second subroutine is performed. The program data and relevant addresses are referred to as the "context" of the calling subroutine.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

For the purposes of this description, the CALL instruction is used in a generic sense to indicate any instruction that causes the processor to jump to a separate sequence of instructions. Likewise the RETURN or RET instruction is used in a generic sense to indicate any instruction that causes the processor to return to a return address associated with a corresponding CALL instruction. "Context" and "context data" are used in a generic sense to indicate program data/addresses needed by a given subroutine to function coherently after the given subroutine returns from a called subroutine referenced in the CALL instruction.

At a minimum the context data for a subroutine includes a return address (RA) which indicates the address storing the subroutine instruction to which the RET operation should return. Context data for a subroutine may also include data generated or used by the subroutine (e.g., variable values, results of calculations, and so on). Context data for a subroutine may include addresses (e.g., branching addresses for use in conditional operations in the subroutine, a stack pointer, and so on). The amount and type of context data varies amongst subroutines. Some subroutines require just the return address. Other subroutines' contexts will include a stack pointer and/or program data that is stored in registers that may be accessed and modified in the called subroutine. Some subroutines' contexts include fewer data values and/or addresses than other subroutines.

There are several approaches to handling context data upon execution of a CALL instruction. For example, the context may be stored using separate instructions like PUSH/POP, and related instructions. The use of separate instructions that specify which context data to store/restore minimizes the time and processing power in saving the context data. However, processing these separate instructions adds additional instructions and latency. Another approach is to arbitrarily assign a default context that is stored/restored when a certain CALL/RET instruction is executed. While this approach does away with the need for additional instructions and the associated latency, storing/restoring a default context may include the storing/restoring of data that is not needed by the calling subroutine upon return. This adds unnecessary latency for subroutines that do not require the entirety of the arbitrarily assigned default context.

The following description outlines systems, methods, and circuitries that provide and support CALL/RET instructions that explicitly identify context to be stored/restored within the instruction itself. This allows for a configurable context for CALL/RET instructions without the need for separate instructions and avoids additional latency incurred when a default context is stored for a subroutine that does not need the entirety of the default context. The following description will be presented in the context of an exemplary processor core architecture with particular instructions, memory configuration, and registers. It is to be understood that the disclosed configurable approach to storing/restoring context within a single CALL/RET instruction can be applied to any processor core architecture.

Figure 1:
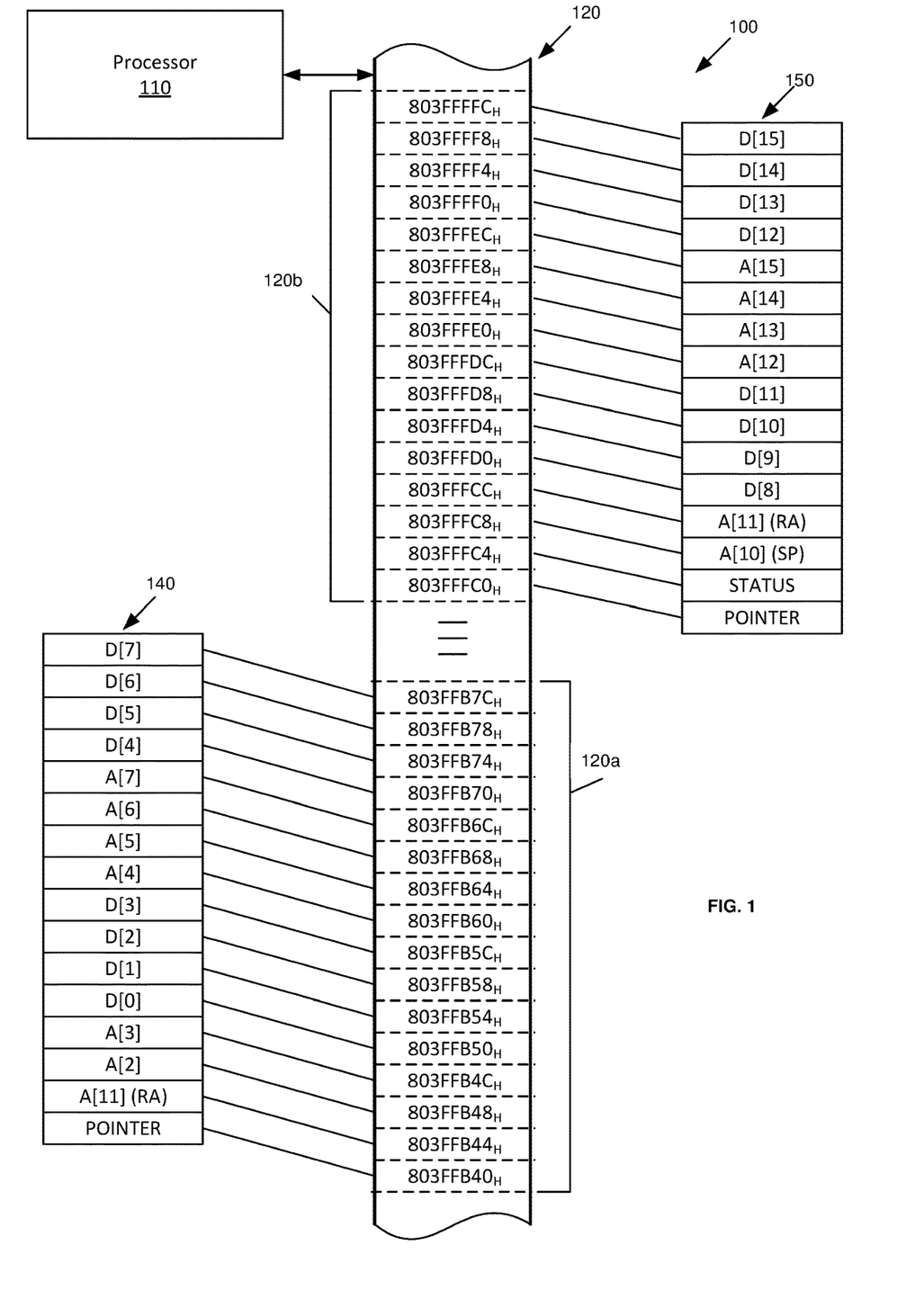
FIG. 1 is a block diagram of an exemplary architecture in which a processor accesses context storage areas (CSAs) to store and retrieve context information, in accordance with various aspects described.

Referring to FIG. 1, a partial architecture of an example processing system 100 is illustrated that includes a processor 110 and storage media or memory. A specific portion 120 of the memory that is used to store context information is illustrated in FIG. 1. The processor 110 is configured to execute instructions corresponding to subroutines. The instructions are able to access and manipulate the contents of a set of general purpose registers. The general purpose registers are divided into data registers D[0]-D[15] and address registers A[0]-A[15]. In the example architecture, registers A[0], A[1], A[8], and A[9] are defined as system global registers whose contents are not saved or restored across calls, traps, or interrupts. Register A[10] is used as a stack pointer (SP), A[11] is used to store the return address (RA) for calls and linked jumps, and to store a program counter (PC) used in interrupts and traps.

In addition to the general purpose registers, a subroutine's context may include program state information. State information registers are provided to store state information. In the illustrated example, a program status (STATUS) register and a previous context information and pointer (POINTER) register. The STATUS register is used to store subroutine-specific architectural state information that is not captured in the general purpose registers such as information related to a protection system and user authorization status bits. The POINTER register stores a link word or address indicating the location of context information for the previous subroutine. The set of general purpose registers and the state information registers are referred to herein as context registers. Other registers are present in the exemplary architecture that are not described herein for the sake of brevity.

From the perspective of the processor, a subroutine is an independent thread of control. The state of a subroutine is defined by its context (e.g., the content of some or all of the general purpose registers and the STATUS and POINTER registers). When a subroutine is interrupted, such as during a CALL/RET instruction sequence, the processor uses the subroutine's context to re-enable the continued execution of the subroutine. The exemplary architecture illustrated in FIG. 1 divides the context registers into a lower context 140 and an upper context 150. The upper context 150 includes upper address registers A[10] to A[15] and upper data registers D[8] to D[15] as well as the POINTER and STATUS registers. These registers are designated as non-volatile for purposes of function-calling (their contents are preserved across calls). The lower context includes lower address registers A[2]-A[7], lower data registers D[0] to D[7], the POINTER register, as well as A[11] which stores the return address. A[11] is also part of the upper context. An upper or lower context, when saved to memory, occupies 16 word blocks of storage, is known collectively as a context save area (CSA). Two CSAs 120a, 120b are illustrated in FIG. 1. Each memory block in a CSA is mapped to a context register in and stores the contents of that mapped register.

The architecture switches subroutines when an interrupt, trap, function call, interrupt service routine, or an explicit instruction that causes storage/loading of the upper or lower context occurs. In one example architecture, the upper context is saved automatically as a result of an external interrupt, trap, or regular function call. The lower context is saved explicitly through instructions. In other architectures, other sets of context registers may be stored automatically as a result of an external interrupt, trap, or regular function call. In one sense, the upper and lower contexts of FIG. 1 are each a "default" set of registers whose contents are stored, as an indivisible group, in a CSA in response to an instruction that does not identify individual context registers to store/restore.

When a function call is made (e.g., by execution of a CALL instruction), the context of the calling subroutine is saved and then restored in a corresponding RET instruction in order to resume the calling subroutine's execution after return from the function. On a regular function call the entire set of upper context registers is saved by hardware. The saving of the upper context by the CALL instruction happens in parallel with the call jump (e.g., during calculation of the target address). Restoring the upper context is performed by the RET instruction and takes place in parallel with the return jump. In this manner, the called function does not need to save and restore the calling function's context and is freed of any need to restrict its usage of the upper context registers. The calling and called functions co-operate on the use of the lower context registers by way of explicit instructions to store/restore the lower context registers.

In one example, "fast call" and "fast return" instructions can be used when saving and restoring the upper context is not required. The fast call instruction saves only the return address to the stack and the fast return instruction returns to the address stored in the stack. The calling function then resumes execution with a context modified by the called function. Thus, when the fast call and fast return instructions are used, the called function and the calling function co-operate on use of the context purpose registers.

Figure 2:
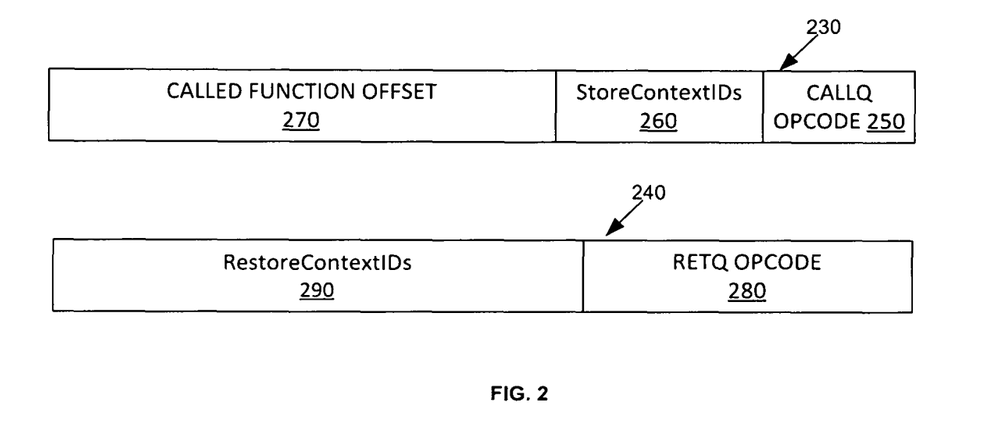
FIG. 2 illustrates exemplary CALL and RETURN instructions that identify a set of context registers, in accordance with various aspects described.

FIG. 2 illustrates an exemplary CALLQ instruction 230 and an exemplary RETQ instruction 240 that include, within the instruction itself, an identification of context registers that should be stored/restored. The "CALLQ" and "RETQ" instructions are to be distinguished from a "regular" CALL/RET instructions that automatically store/restore a default set of registers (e.g., the upper context) and the "fast" CALL/RET instructions that automatically store/restore only the return address. Neither of these types of CALL/RET instructions identify a set of context registers that should be stored/restored within the instruction itself.

The CALLQ instruction 230 includes a first set of bits 250 that encode a CALLQ opcode that uniquely identifies the CALLQ instruction from other instructions in the instruction set. The CALLQ instruction includes a second set of bits 260 that encode an identification of context registers (StoreContextIDs) whose contents should be stored prior to making the jump to the called routine. The set of bits 260 that store the StoreContextIDs may encode a list of registers. Alternatively, the set of bits 260 that store the StoreContextIDs may encode a constant or bitmap that is mapped to a particular subset(s) of registers so that one or more optional subsets may be selected by changing the constant or bitmap. This reduces the number of bits needed to encode individual register identifiers. The CALLQ instruction includes a third set of bits 270 that encodes a called function offset, which is used to calculate a target address at which begins instructions for the called function.

Similarly, the RETQ instruction 240 includes a first set of bits 280 that encode a RETQ opcode that uniquely identifies the RETQ instruction from other instructions in the instruction set. The RETQ instruction includes a second set of bits 290(RestoreContextIDs) that encode an identification of context registers whose contents should be restored prior to returning to the calling subroutine. The set of bits 290 that store the RestoreContextIDs may encode a constant or bitmap that is mapped to a particular subset(s) of registers so that one or more optional subsets may be selected by changing the constant or bitmap. This reduces the number of bits needed to encode individual register identifiers. It can be seen that using the CALLQ and RETQ instructions makes it possible to store/restore the contents of specific context registers without storing/restoring the contents of context registers that are not relevant to the calling subroutine and also without using separate instructions to store/restore certain context registers.

For example, the following pseudocode illustrates operation of the CALLQ and RETQ instruction. It is assumed that function_a( ) is being performed and that function_a( ) uses general purpose registers D[0], D[5], and D[10] and the values of these registers should not be modified by another subroutine while function_a( ) is in execution. To call function_b( ) and store the contents of D[0], D[5], and D[10], function_a( ) could include the following instruction:

CALLQ<D0,D5,D10>function_b( );

This instruction causes the processor to store the contents of D[0], D[5], and D[10] in a CSA for function_a( ) in the memory blocks mapped to registers D[0], D[5], and D[10]. Function_b( ) could include the following instruction:

RETQ<D0,D5,D10>;

This instruction causes the contents of memory blocks in the CSA mapped to registers D[0], D[5], and D[10] to be restored to their corresponding general purpose registers prior to function_a( ) resuming execution.

In one example, the size and mapping of the CSA that stores the selected context registers remains the same regardless of how many context registers are saved. The state of the memory blocks mapped to context registers that are not specified in the CALLQ instruction is undefined. This approach simplifies the storing of multiple CSAs as the beginning and end of each CSA remains the same. In another example, the CSA has memory blocks only for those context registers identified in the CALLQ instruction. This approach conserves storage media or memory but possibly adds complexity to tracking linked CSAs resulting from nested subroutines.

Figure 3:
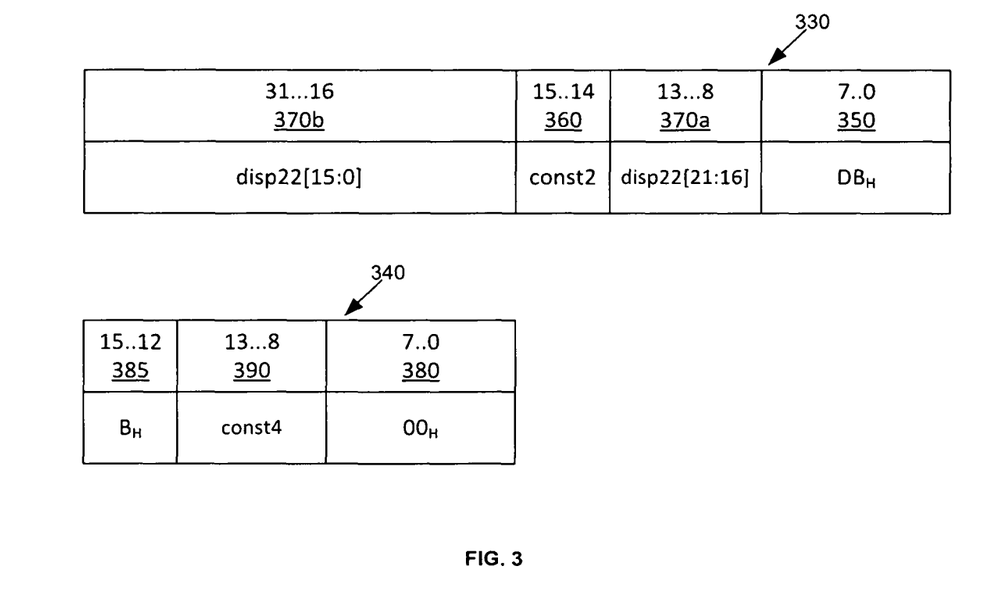
FIG. 3 illustrates exemplary CALL and RETURN instructions that identify a set of context registers using a constant passed in the instructions, in accordance with various aspects described.

FIG. 3 illustrates an exemplary CALLQ instruction 330 and an exemplary RETQ instruction 340. The CALLQ instruction 330 is a 32-bit instruction that includes 8 bits 350 that encode the CALLQ opcode. The CALLQ instruction includes two bits 360 that encode a constant (const2) that indicates one or more context registers whose contents should be stored. A set of 22 bits 370a, 370b encodes an offset to be used to calculate the target address for the CALLQ. The CALLQ instruction may take the following form:

CALLQ const2,disp22(B)

Each value of const2 is mapped to a different set of context registers. For example, when the value of const2 is b00, the contents of the POINTER register, the STATUS register, A [10], and A [11] are stored in a CSA associated with the calling subroutine. When the value of const2 is b01 the contents of the POINTER register, the STATUS register, A [10], A [11], D [8], D [9], D [10], and D [11] are stored in a CSA associated with the calling subroutine. When the value of const2 is b01 b10 the contents of the POINTER register, the STATUS register, A [10], A [11], D [8], D [9], D [10], D [11], D [12], D [13], D [14], and D [15] are stored in a CSA associated with the calling subroutine. When the value of const2 is b11 the contents of the POINTER register, the STATUS register, A [10], A [11], A [12], A [13], A [14], A [15], D [12], D [13], D [14], and D [15] are stored in a CSA associated with the calling subroutine. The particular set of context registers mapped to a given constant value may be configurable for a given instance of the instruction set.

The RETQ instruction 340 is a 16-bit instruction that includes 8 bits 380 that encode an opcode and 4 bits 385 that encode a secondary opcode. The RETQ instruction includes a 4 bit binary constant (const4) 390, with each bit being mapped to a set of context registers. The RETQ instruction may take the following form:

RETQ const4(SRET)

In one example, when the least significant bit of const4 is 0, the POINTER register, the STATUS register, A[10], and A[11] are restored. When the next least significant bit is 0, then D[8], D[9], D[10], and D[11] are restored. When the next least significant bit is 0, then A[12], A[13], A[14], and A[15] are restored. When the most significant bit is 0, then D[12], D[13], D[14], and D[15] are restored. Thus, if const4==0000 then RETQ is treated as a normal RET (in which the upper context is restored). Note that in the example illustrated in FIGS. 2 and 3, the context registers identified in the RET instruction are independent of the context registers identified in the corresponding CALL instruction. In other words, the CALL instruction identifies a first set of context registers while the RET instruction identifies a second set of context registers, which in some but not all cases, will be identical to the first set of registers.

Figure 4:
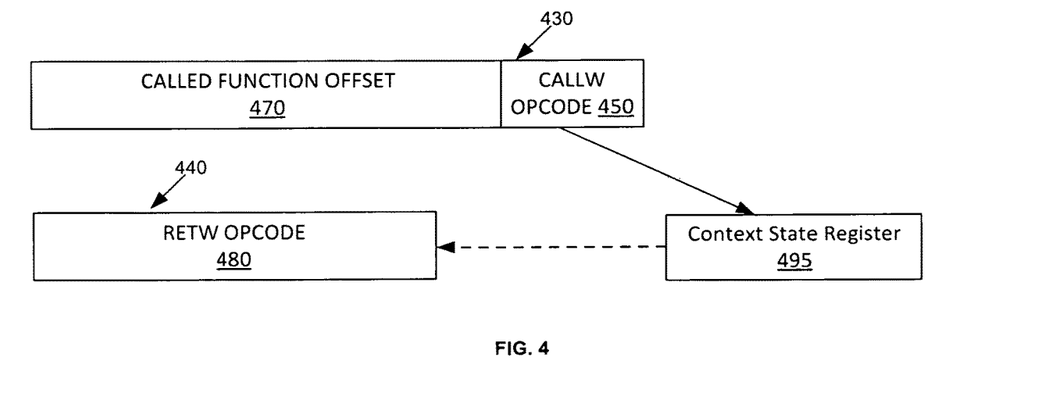
FIG. 4 illustrates a functional flow of exemplary CALL and RETURN instructions that store a set of context register identifiers in a context state register, in accordance with various aspects described.

FIG. 4 illustrates an exemplary call instruction CALLW 430 and an exemplary return instruction RETW 440 that utilize a context state register 495 (e.g., the STATUS register) to store an identification of context registers that are to be stored/restored. The CALLW instruction includes a CALLW opcode 450 and a called function offset 470. There are one or more CALLW opcodes, with each unique CALLW opcode being mapped to or associated with a set of context registers by the architecture. When the processor (e.g., 110 of FIG. 1) executes the CALLW instruction, the processor stores identifying information for the context registers associated with the particular CALLW opcode in the context state register 495. For example, the processor may store a list of context register identifiers or a constant mapped to a set of context registers as described above in the state register. The processor stores the content of the state register and the content of the context registers associated with the CALLW opcode in memory allocated for context storage for the calling subroutine. Thus, the state register is part of the context of the calling subroutine.

The use of the state register 495 to store identification of context registers to be restored allows for a generic RETW instruction that does not directly indicate within the instruction itself which context registers are to be restored. Instead, when the processor executes the RETW instruction, the processor restores context registers identified in the state register 495 in the context for the subroutine to which the processor is returning.

Figure 5:
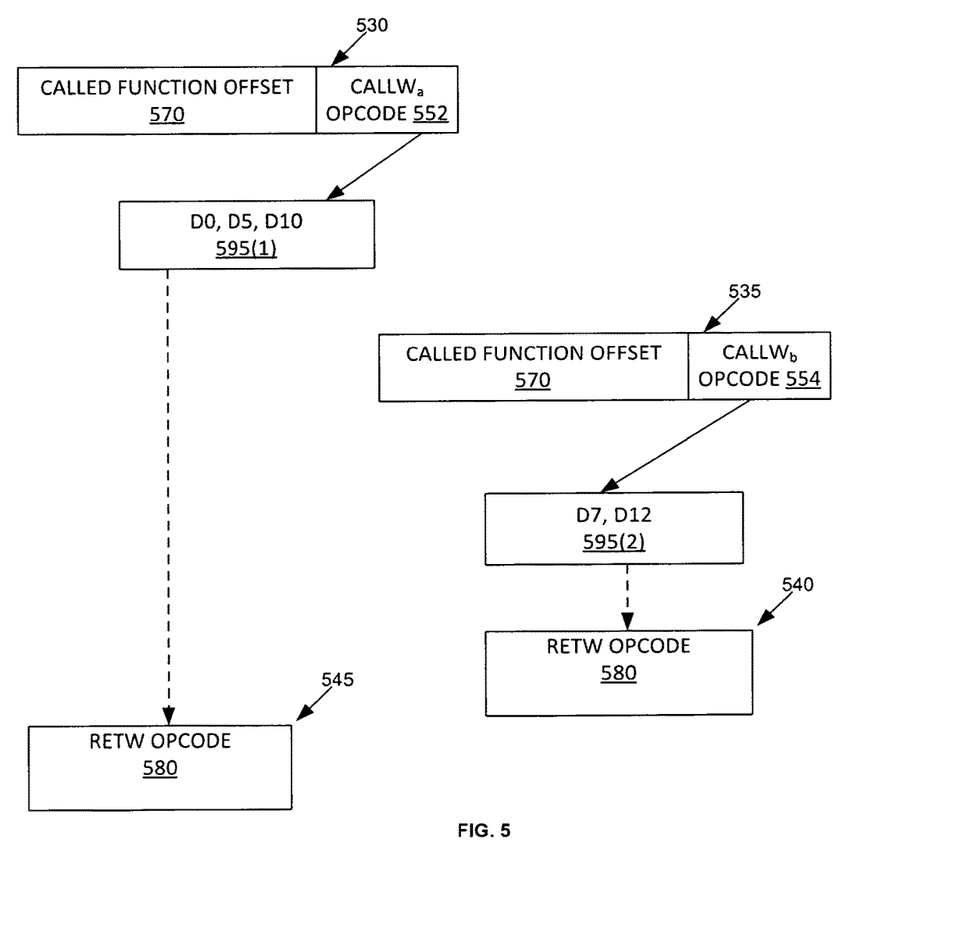
FIG. 5 illustrates a function flow of exemplary CALL and RETURN instructions that store a set of context register identifiers in a context state register, in accordance with various aspects described.

FIG. 5 illustrates an example of how using a context state register 595 to store identification of context registers to be restored can be advantageous in execution of nested subroutines. During execution of subroutine 1, a first CALLW instruction 530 having opcode 552 "CALLW$_a$" and a called function offset 570 is executed to cause a jump to subroutine 2. Prior to jumping to subroutine 2, the processor stores identifying information for a set of context registers mapped to the CALLW$_a$ instruction (D0, D5, D10 in the illustrated example) in a state register 595(1) as part of the context for subroutine 1. The processor also stores the contents of the identified context registers in the context for subroutine 1.

During execution of the subroutine 2, a second CALLW instruction 535 to jump to subroutine 3 is encountered by the processor. The CALLW instruction 535 includes opcode 554 "CALLWb." The opcode CALLWb is mapped to context registers D[7] and D[12]. Prior to jumping to subroutine 3, the processor stores identifying information for D[7] and D[12] in state register 595(2) as part of the context for subroutine 2.

When, during execution of subroutine 3, the RETW instruction 540 is executed, the contents of context registers identified in state register 595(2) (i.e., D[7] and D[12]) are restored prior to returning to subroutine 2. Then when RETW instruction 545 is executed, the contents of context registers identified in state register 595(1) (i.e., D[0], D[5], D[10]) are restored prior to returning to subroutine 1. It can be seen that a generic return instruction RETW 580 can be used regardless of how many nested subroutines have executed prior to the return. The return instruction does not need to explicitly identify context identifiers. Rather, when executing the return instruction the processor reads the state register in the stored context for a subroutine to identify context registers to be restored prior to returning to the subroutine.

Following are several flow diagrams outlining example methods. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

Figure 6:
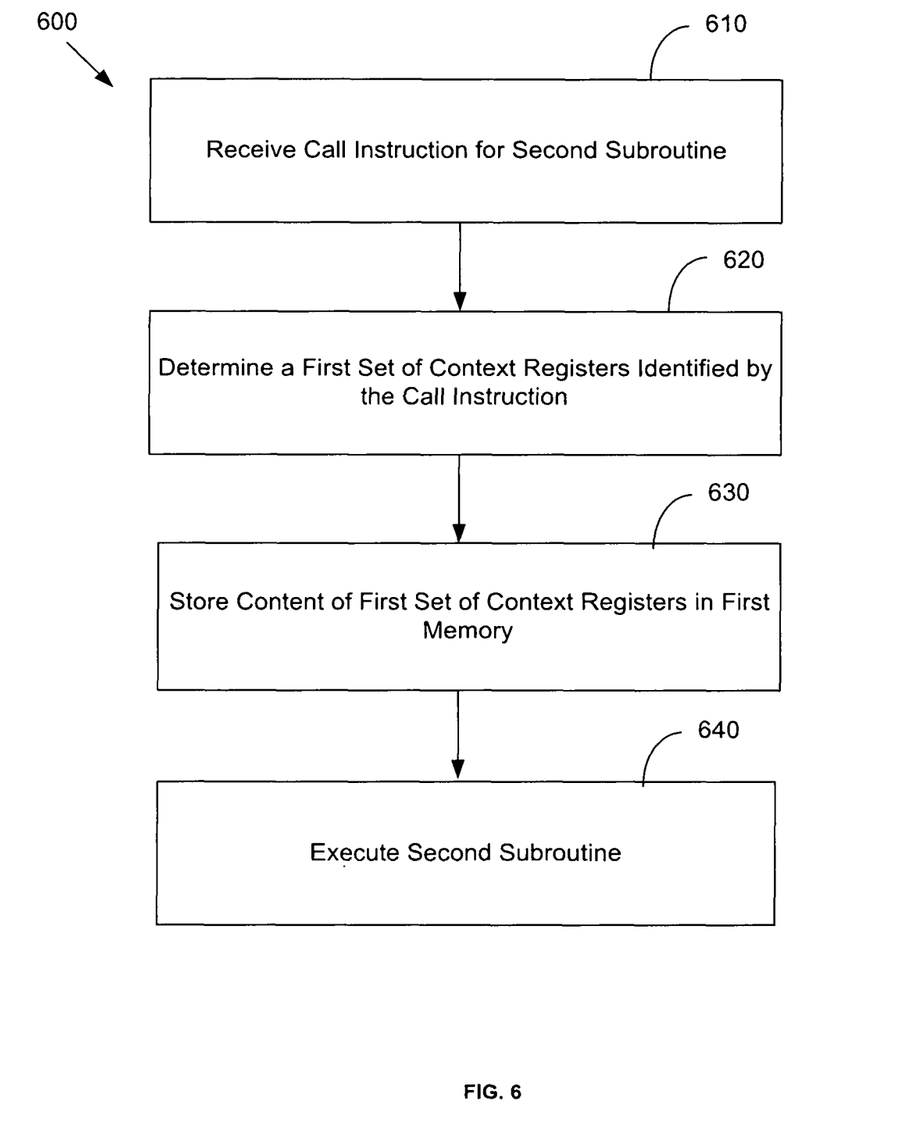
FIG. 6 is a flow diagram outlining an exemplary method of processing a call instruction that identifies context registers, in accordance with various aspects described.

FIG. 6 is a flow diagram outlining an example method 600 for processing, during execution of a first subroutine, a call instruction that identifies context registers. At 610, the method includes receiving a call instruction that includes a first opcode and identifies a target address storing instructions configured to cause a processor to perform a second subroutine. At 620 a first set of context registers identified by the call instruction is determined. The determining may be accomplished by parsing the call instruction to identify context registers explicitly listed or encoded in the instruction. The determining may be performed by identifying a constant or bitmap in the call instruction that indirectly identifies, or is mapped to, a set of context registers not explicitly identified in the call instruction. The determining may be performed identifying a set of context registers mapped to, or associated with, the first opcode by the architecture.

At 630 the content of the first set of context registers is stored in first memory allocated for context storage for the first subroutine. In one example the first memory allocated for context storage includes a CSA having memory blocks mapped to context registers as illustrated in FIG. 1. In one example, identifying information for the first set of context registers is stored in a state register in the first memory allocated for context storage for the first subroutine. At 640 the instruction stored in the first target address is executed to begin execution of the second subroutine.

In one example, the first set of context registers is a proper nonempty subset of a default set of context registers, such as the upper context or lower context of FIG. 1. The contents of the default set of context register are stored in memory allocated for context storage in response to receiving a different call instruction (e.g., normal CALL or FCALL) that does not identify one or more context registers.

Figure 7:
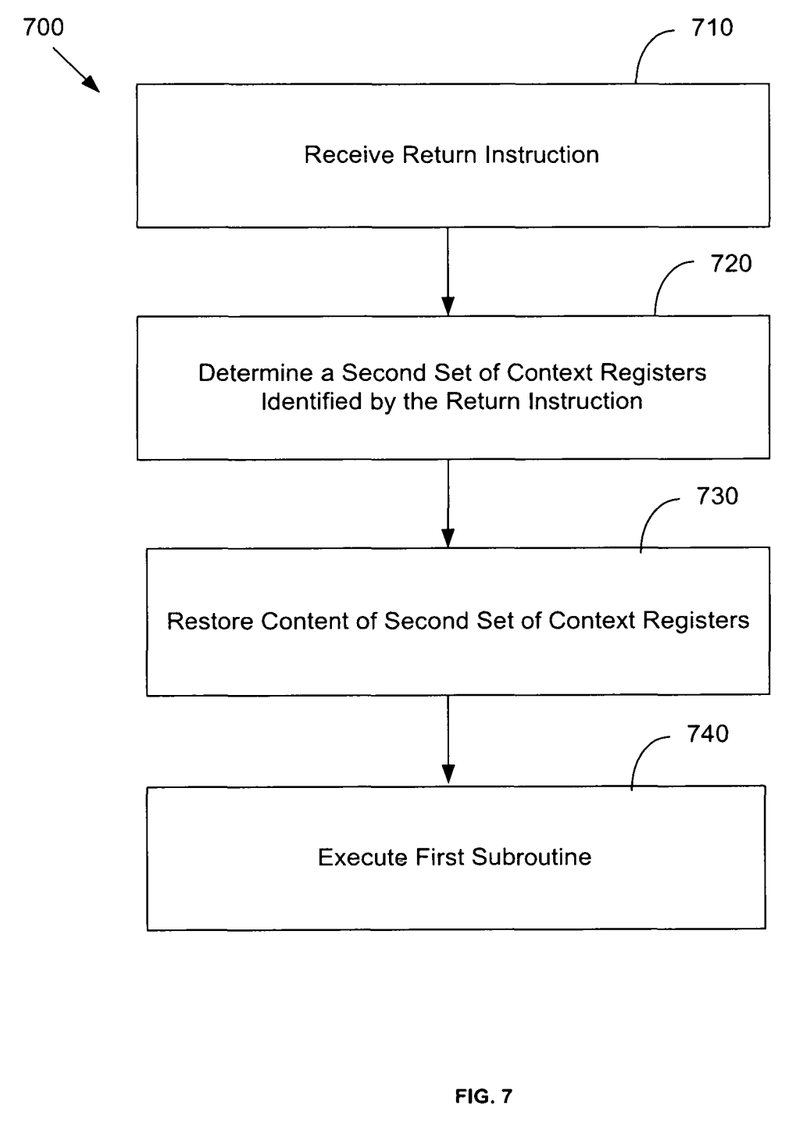
FIG. 7 is a flow diagram outlining an exemplary method of processing a return instruction that identifies context registers, in accordance with various aspects described.

FIG. 7 is a flow diagram outlining an example method 700 for processing, during execution of a second subroutine, a return instruction that identifies context registers. At 710, the method includes receiving a return instruction that includes a second opcode and identifies a second target address storing instructions configured to cause a processor to perform a first subroutine. At 720 a second set of context registers identified by the return instruction is determined. The determining may be accomplished by parsing the call instruction to identify context registers explicitly listed or encoded in the instruction. The determining may be performed by identifying a constant or bitmap in the return instruction that indirectly identifies, or is mapped to, a set of context registers not explicitly identified in the call instruction. The determining may be performed identifying a set of context registers mapped to, or associated with, the second opcode by the architecture.

At 730 the content of the second set of context registers is restored from first memory allocated for context storage for the first subroutine. In one example the first memory allocated for context storage includes a CSA having memory blocks mapped to context registers as illustrated in FIG. 1. At 740 the instruction stored in the second target address is executed to begin execution of the first subroutine.

Figure 8:
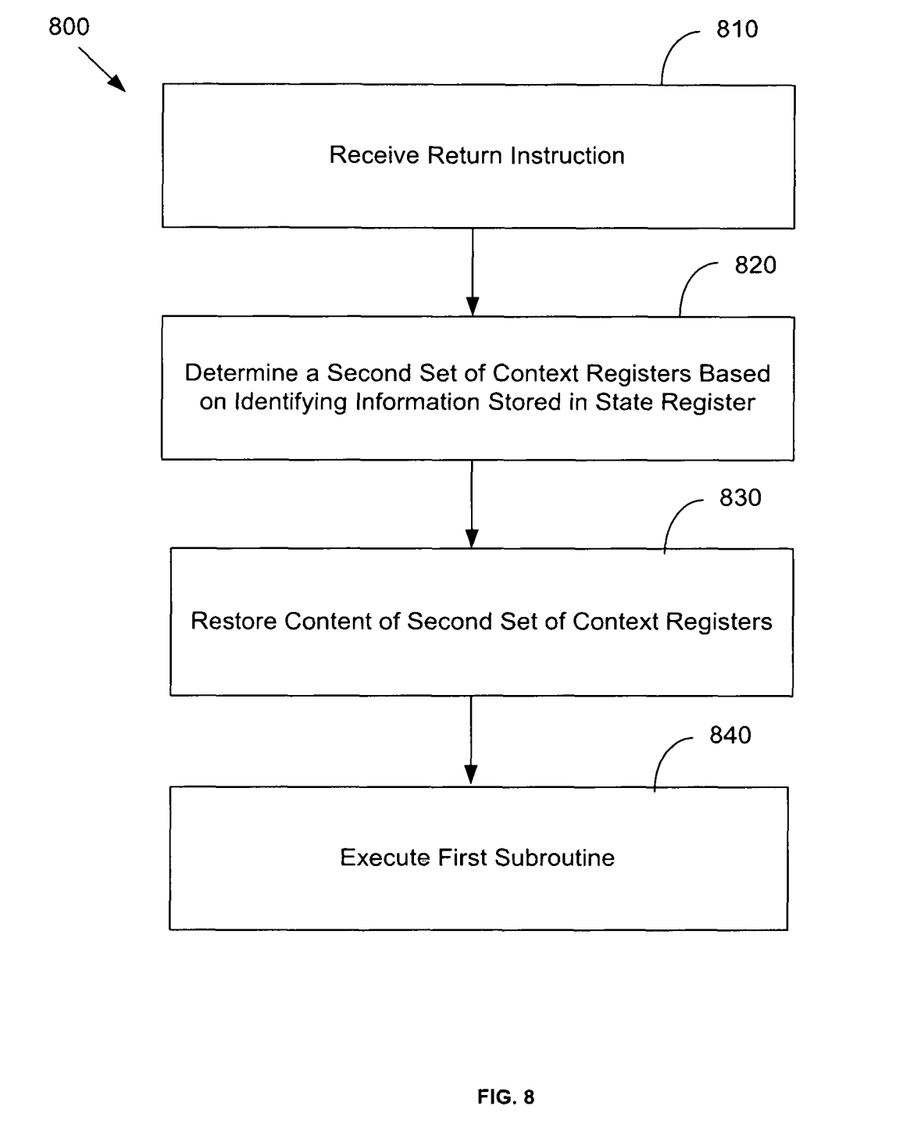
FIG. 8 is a flow diagram outlining an exemplary method of processing a return instruction, in accordance with various aspects described.

FIG. 8 is a flow diagram outlining an example method 800 for processing, during execution of a second subroutine, a return instruction that identifies context registers. At 810, the method includes receiving a return instruction that includes a second opcode and identifies a second target address storing instructions configured to cause a processor to perform a first subroutine. At 820 a second set of context registers identified by the return instruction is determined based on identifying information stored in a state register in first memory allocated for context storage for the first subroutine.

At 830 the content of the second set of context registers is restored from the first memory allocated for context storage for the first subroutine. In one example the first memory allocated for context storage includes a CSA having memory blocks mapped to context registers as illustrated in FIG. 1. At 840 the instruction stored in the second target address is executed to begin execution of the first subroutine.

It can be seen from the foregoing description that the described call and return instructions ensure that only desired context registers are saved and restored as compared to an arbitrary default set of context registers, thus saving processing cycles. The described instructions eliminate the need for separate operations to save/restore specific context registers, reducing code size and saving cycles in processing the separate instructions. Additionally, by allowing for flexibility in which context registers are saved/restored, limitations caused by an arbitrary and fixed set of context registers that are saved/restored such as limitations on how registers can be allocated can be avoided.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to provide safety management on a per-application group basis according to embodiments and examples described herein.

Example 1 is a method, including receiving, while executing a first subroutine, a call instruction that includes a first opcode and identifies a first target address, wherein the first target address stores a first instruction of a set of instructions for performing a second subroutine; determining a first set of context registers identified by the call instruction; storing content of the first set of context registers in first memory allocated for context storage for the first subroutine; and executing the first instruction stored in the first target address.

Example 2 includes the subject matter of example 1, including or omitting optional elements, including determining the first set of context registers by identifying a constant included in the call instruction; and determining, as the first set of context registers, context registers mapped to the constant.

Example 3 includes the subject matter of example 1, including or omitting optional elements, including determining the first set of context registers by identifying a set of context registers mapped to the first opcode.

Example 4 includes the subject matter of example 1, including or omitting optional elements, including determining the first set of context registers by identifying context register identifiers contained in the call instruction.

Example 5 includes the subject matter of example 1, including or omitting optional elements, including storing identifying information for the first set of context registers in a state register in the first memory allocated for context storage for the first subroutine.

Example 6 is a method, including while executing a second subroutine, receiving a return instruction that includes a second opcode and identifies a second target address, wherein the second target address stores a first instruction of a set of instructions for performing a first subroutine; determining a second set of context registers identified in the return instruction; restoring content of the second set of context registers from first memory allocated for context storage for the first subroutine; and executing the first instruction stored in the second target address.

Example 7 includes the subject matter of example 6, including or omitting optional elements, including determining the second set of context registers by identifying a constant included in the return instruction; and determining, as the second set of context registers, context registers mapped to the constant.

Example 8 includes the subject matter of example 6, including or omitting optional elements, including determining the second set of context registers by identifying a set of context registers mapped to the second opcode.

Example 9 includes the subject matter of example 6, including or omitting optional elements, including determining the second set of context registers by identifying context register identifiers contained in the return instruction.

Example 10 is a method, including, while executing a second subroutine, receiving a return instruction that includes a second opcode and identifies a second target address, wherein the second target address stores a first instruction of a set of instructions for performing a first subroutine; determining a second set of context registers based on identifying information stored in a state register in a first memory allocated for context storage for the first subroutine; restoring content of the second set of context registers from the first memory allocated for context storage for the first subroutine; and executing the first instruction stored in the second target address.

Example 11 is a processor configured to perform operations, the operations including receiving, while executing a first subroutine, a call instruction that includes a first opcode and identifies a first target address, wherein the first target address stores a first instruction of a set of instructions for performing a second subroutine; determining a first set of context registers identified by the call instruction; storing content of the first set of context registers in first memory allocated for context storage for the first subroutine; and executing the first instruction stored in the first target address.

Example 12 includes the subject matter of example 11, including or omitting optional elements, wherein the processor is further configured to perform operations including identifying a constant included in the call instruction; and determining, as the first set of context registers, context registers mapped to the constant.

Example 13 includes the subject matter of example 11, including or omitting optional elements, wherein the processor is further configured to perform operations including determining the first set of context registers by identifying a set of context registers mapped to the first opcode.

Example 14 includes the subject matter of example 11, including or omitting optional elements, wherein the processor is further configured to perform operations including determining the first set of context registers by identifying context register identifiers contained in the call instruction.

Example 15 includes the subject matter of example 11, including or omitting optional elements, wherein the processor is further configured to perform operations including storing identifying information for the first set of context registers in a state register in the first memory allocated for context storage for the first subroutine.

Example 16 includes the subject matter of example 11, including or omitting optional elements, wherein the processor is further configured to perform operations including receiving a return instruction that includes a second opcode and identifies a second target address, wherein the second target address stores a first instruction of a set of instructions for performing the first subroutine; determining a second set of context registers identified in the return instruction; restoring the content of the second set of context registers from the first memory allocated for context storage; and executing the first instruction stored in the second target address.

Example 17 includes the subject matter of example 16, including or omitting optional elements, wherein the processor is further configured to perform operations including identifying a constant included in the return instruction; and determining, as the second set of context registers, context registers mapped to the constant.

Example 18 includes the subject matter of example 16, including or omitting optional elements, wherein the processor is further configured to perform operations including determining the second set of context registers by identifying a set of context registers mapped to the second opcode.

Example 19 includes the subject matter of example 16, including or omitting optional elements, wherein the processor is further configured to perform operations including determining the second set of context registers by identifying context register identifiers contained in the return instruction.

Example 20 includes the subject matter of example 16, including or omitting optional elements, wherein the processor is further configured to perform operations including receiving a return instruction that includes a second opcode and identifies a second target address, wherein the second target address stores a first instruction of a set of instructions for performing the first subroutine; determining a second set of context registers based on identifying information stored in a state register in the first memory allocated for context storage for the first subroutine; restoring the content of the second set of context registers from the first memory allocated for context storage; and executing the first instruction stored in the second target address.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

Various illustrative logics, logical blocks, modules, circuitries, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof. As used herein the term "or" includes the option of all elements related by the word or. For example A or B is to be construed as include only A, only B, and both A and B. Further the phrase "one or more of" followed by A, B, or C is to be construed as including A, B, C, AB, AC, BC, and ABC

What is claimed is:

1. A method, comprising:
   providing a plurality of opcodes for executing a call instruction, each of the plurality of opcodes mapped to a respective different set of context registers;
   receiving, while executing a first subroutine, a first call instruction that includes a first opcode and identifies a first target address, wherein the first target address stores a first instruction of a set of instructions for performing a second subroutine;
   determining a first set of context registers mapped to the first opcode;
   storing content of the first set of context registers in first memory allocated for context storage for the first subroutine;
   jumping to the first target address;
   receiving a second call instruction that includes a second opcode, different from the first opcode, and identifies the first target address;
   determining a second set of context registers, different from the first set of context registers, mapped to the second opcode;
   storing content of the second set of context registers in second memory allocated for context storage for the second subroutine; and
   executing the first instruction stored in the first target address.

2. The method of claim 1, comprising storing identifying information for the first set of context registers in a state register in the first memory allocated for context storage for the first subroutine.

3. A method, comprising:
   receiving, while executing a first subroutine, a first call instruction that includes a first opcode and identifies a first target address, wherein the first target address stores a first instruction of a set of instructions for performing a second subroutine;
   determining a first set of context registers mapped to the first opcode, wherein the determining is based on the first opcode and not the first target address;
   storing content of the first set of context registers in first memory allocated for context storage for the first subroutine; and
   storing identifying information of the first set of context registers in a status register for the first subroutine;
   jumping to the first target address;
   while executing the second subroutine, receiving a return instruction that includes a second opcode and identifies a second target address, wherein the second target address stores a particular instruction of a set of instructions for performing the first subroutine;

determining the first set of context registers based on the identifying information of the first set of context registers stored in the status register for the first subroutine;

restoring content of the first set of context registers from the first memory allocated for context storage for the first subroutine; and executing the particular instruction stored in the second target address.

4. A processor configured to perform operations, the operations comprising:

receiving, while executing a first subroutine, a call instruction that includes a first opcode and identifies a first target address, wherein the first target address stores a first instruction of a set of instructions for performing a second subroutine;

determining a first set of context registers mapped to the first opcode;

storing content of the first set of context registers in first memory allocated for context storage for the first subroutine; and jumping to the first target address;

receiving a second call instruction that includes a second opcode, different from the first opcode, and identifies the first target address;

determining a second set of context registers, different from the first set of context registers, mapped to the second opcode;

storing content of the second set of context registers in second memory allocated for context storage for the second subroutine; and executing the first instruction stored in the first target address.

5. The processor of claim 4, further configured to perform operations comprising storing identifying information for the first set of context registers in a state register in the first memory allocated for context storage for the first subroutine.

6. The processor of claim 4, further configured to perform operations comprising:

receiving a return instruction that includes a third opcode and identifies a third target address, wherein the third target address stores a particular instruction of a set of instructions for performing the first subroutine;

restoring content of the first set of context registers from the first memory based on identifying information stored in a status register for the first subroutine; and executing the particular instruction stored in the third target address.

* * * * *